United States Patent
Yang et al.

(10) Patent No.: US 10,744,898 B2
(45) Date of Patent: Aug. 18, 2020

(54) MOTOR DRIVING AND BATTERY CHARGING APPARATUS AND VEHICLE

(71) Applicants: Hyundai Motor Company, Seoul (KR); Kia Motors Corporation, Seoul (KR)

(72) Inventors: Jin Myeong Yang, Busan (KR); Woo Young Lee, Gyeonggi-do (KR); Jun Ho Kim, Gyeonggi-do (KR); Sihun Yang, Gyeonggi-do (KR); Youngjin Kim, Incheon (KR); Jae Eun Cha, Gyeonggi-do (KR); Dae Woo Lee, Incheon (KR); Inyong Yeo, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 362 days.

(21) Appl. No.: 15/827,502

(22) Filed: Nov. 30, 2017

(65) Prior Publication Data

US 2019/0061553 A1    Feb. 28, 2019

(30) Foreign Application Priority Data

Aug. 24, 2017  (KR) .................. 10-2017-0707282

(51) Int. Cl.
*B60L 58/20* (2019.01)
*B60L 53/20* (2019.01)
*B60L 58/22* (2019.01)

(52) U.S. Cl.
CPC ............ *B60L 58/20* (2019.02); *B60L 53/20* (2019.02); *B60L 58/22* (2019.02); *B60L 2210/10* (2013.01); *B60L 2240/547* (2013.01)

(58) Field of Classification Search
CPC .......... B60L 58/20; B60L 58/22; B60L 53/20; B60L 2210/10; B60L 2240/547; Y02T 10/7005; Y02T 10/7066; Y02T 10/7072
See application file for complete search history.

(56) References Cited

U.S. PATENT DOCUMENTS

| | | | | |
|---|---|---|---|---|
| 2011/0181236 A1* | 7/2011 | Yang | ................. | B60L 58/20 320/107 |
| 2013/0147431 A1* | 6/2013 | Lim | ................. | B60L 50/16 320/109 |
| 2014/0097792 A1* | 4/2014 | Su | ................. | B60L 53/20 320/108 |
| 2018/0334043 A1* | 11/2018 | Zou | ................. | H02J 3/16 |

* cited by examiner

*Primary Examiner* — Richard Isla
*Assistant Examiner* — Johali A Torres Ruiz
(74) *Attorney, Agent, or Firm* — Mintz Levin Cohn Ferris Glovsky and Popeo, P.C.; Peter F. Corless

(57) ABSTRACT

A motor driving and battery charging apparatus is provided. The apparatus includes a motor having a plurality of coils, a rectifier circuit connected to the plurality of coils, and a high voltage battery. An inverter generates a driving current from an output voltage of the high voltage battery and supplies the driving current to the motor while the motor operates. While the high voltage battery is charged, the rectifier circuit rectifies an alternating current (AC) of an external power source, the motor and the inverter compensate for a power factor of the current rectified by the rectifier circuit, and the high voltage battery is charged with an output current of the motor and the inverter.

16 Claims, 11 Drawing Sheets

MOTOR DRIVING AND BATTERY CHARGING APPARATUS AND VEHICLE

CROSS-REFERENCE TO RELATED APPLICATION

This application claims the benefit of Korean Patent Application No. 10-2017-0107282, filed on Aug. 24, 2017, the disclosure of which is incorporated herein by reference.

BACKGROUND

1. Field of the Disclosure

The present disclosure relates to a motor driving and battery charging apparatus and a vehicle, and more particularly, to a motor driving and battery charging apparatus and a vehicle capable of charging a vehicle battery from an external alternating current (AC) power source.

2. Description of the Related Art

Generally, a vehicle refers to a moving apparatus or transfer apparatus configured to travel on roads or rail ways using a fossil fuel, electricity, and the like as a power source. Vehicles using fossil fuels may discharge fine dust, water vapor, carbon dioxide, carbon monoxide, hydrocarbons, nitrogen, nitrogen oxides, and/or sulfur oxides due to the combustion of the fossil fuels. Water vapor and carbon dioxide are known to be a cause of global warming, and fine dust, carbon monoxide, hydrocarbons, nitrogen oxides, and/or sulfur oxides are known to be air pollutants that may harm people.

Due to such discharges, vehicles using environmentally friendly energy that replaces fossil fuels have recently been developed. For example, hybrid electric vehicles (HEVs) that use both a fossil fuel and electricity, electric vehicles (EVs) that use electricity only, and the like are being developed. A high voltage battery configured to supply power to a motor configured to move a vehicle and a low voltage battery configured to supply power to electric parts of the vehicle are provided separately in each of an HEV and an EV. In addition, each of the HEV and EV typically include a converter configured to convert a voltage of the high voltage battery into a voltage of the low voltage battery to supply electric power from the high voltage battery to the low voltage battery.

SUMMARY

Therefore, it is an aspect of the present disclosure to provide a motor driving and battery charging apparatus and a vehicle that do not use an additional charging apparatus for charging a vehicle battery from an external alternating current (AC) power source. It is another aspect of the present disclosure to provide a motor driving and battery charging apparatus and a vehicle which are capable of charging a vehicle battery from an external AC power source using a driving motor and an inverter. It is still another aspect of the present disclosure to provide a motor driving and battery charging apparatus and a vehicle which are capable of decreasing a vehicle battery charging time using a driving motor and an inverter. Additional aspects of the disclosure will be set forth in part in the description which follows and, in part, will be obvious from the description, or may be learned by practice of the disclosure.

In accordance with one aspect of the present disclosure, a motor driving and battery charging apparatus may include: a motor having a plurality of coils; a rectifier circuit connected to the plurality of coils; a high voltage battery; and an inverter configured to generate a driving current from an output voltage of the high voltage battery and supply the driving current to the motor while the motor operates, wherein, while the high voltage battery is charged, the rectifier circuit is configured to rectify an alternating current (AC) of an external power source, the motor and the inverter are configured to compensate for a power factor of the current rectified by the rectifier circuit, and the high voltage battery may be charged with an output current of the motor and the inverter.

The apparatus may further include: a first switch disposed between the rectifier circuit and the plurality of coils; and a controller configured to turn the first switch off while the motor operates, and turn the first switch on while the high voltage battery is charged. The apparatus may further include: a high direct current (DC)-DC convertor (HDC) configured to increase the output voltage of the high voltage battery while the motor operates; a DC link capacitor configured to apply the voltage increased by the HDC to the inverter; a low voltage battery; and a low DC-DC convertor (LDC) configured to reduce the output voltage of the high voltage battery and apply the reduced voltage to the low voltage battery.

The LDC may include a three winding transformer having a first coil, a second coil, and a third coil, a full bridge circuit configured to generate an AC current from the output voltage of the high voltage battery and output the AC current to the first coil, and a low DC-DC rectifier circuit configured to rectify an AC current output from the second coil and output the rectified current to the low voltage battery, wherein the third coil may be connected to the HDC. While the high voltage battery is charged, the DC link capacitor may be charged with the output current of the motor and the inverter, while the high voltage battery is charged, the HDC may be configured to generate an AC current from an output voltage of the DC link capacitor and output the AC current to the third coil, and while the high voltage battery is charged, the full bridge circuit may be configured to rectify an AC current output from the first coil and output the rectified current to the high voltage battery.

The apparatus may further include: a first switch disposed between the rectifier circuit and the plurality of coils; a second switch disposed between the high voltage battery and the HDC; and a third switch disposed between the third coil and the HDC. The apparatus may further include a controller configured to execute operations of the first switch, the second switch, and the third switch. In particular, while the motor operates, the controller may be configured to turn the first switch off, turn the second switch on, and turn the third switch off, and while the high voltage battery is charged, the controller may be configured to turn the first switch on, turn the second switch off, and turn the third switch on.

In accordance with another aspect of the present disclosure, a motor driving and battery charging apparatus may include: a rectifier circuit configured to rectify an alternating current (AC) supplied from an external power source; a power factor corrector having a plurality of coils disposed in a motor and a plurality of driving switches disposed in an inverter, and configured to compensate for a power factor of the current rectified by the rectifier circuit; and a high voltage battery charged with a current output from the power factor corrector. While the motor operates, the inverter may be configured to generate a driving current from an output voltage of the high voltage battery and supply the driving current to the motor.

The apparatus may further includes: a first switch disposed between the rectifier circuit and the plurality of coils; and a controller configured to turn the first switch off while the motor operates, and turn the first switch on while the high voltage battery is charged. The apparatus may further includes: a direct current (DC) link capacitor charged with the current output from the power factor corrector; and an isolated DC-DC converter configured to change an output voltage of the DC link capacitor and output the changed output voltage to the high voltage battery.

The isolated DC-DC converter may include a three winding transformer having a first coil and a second coil, a primary transformer circuit configured to generate an AC current from the output voltage of the DC link capacitor and output the AC current to the first coil, and a secondary circuit configured to rectify an AC current output from the second coil and output the rectified current to the high voltage battery. While the motor operates, the primary transformer circuit may be connected to the high voltage battery and increase the output voltage of the high voltage battery, and while the motor operates, the DC link capacitor may be configured to apply the voltage increased by the primary transformer circuit to the inverter.

The apparatus may further include: a first switch disposed between the rectifier circuit and the plurality of coils; a second switch disposed between the high voltage battery and the primary transformer circuit; and a third switch disposed between the first coil and the primary transformer circuit. The apparatus may further include a controller configured to operate the first switch, the second switch, and the third switch, wherein, while the high voltage battery is charged, the controller may be configured to turn the first switch on, turn the second switch off, and turn the third switch on, and while the motor operates, the controller may be configured to turn the first switch off, turn the second switch on, and turn the third switch off.

In accordance with still another aspect of the present disclosure, a vehicle may include: a wheel; a motor configured to rotate the wheel and including a plurality of coils; a rectifier circuit configured to rectify an alternating current (AC) supplied from an external power source, and connected to the plurality of coils; a high voltage battery; and an inverter configured to generate a driving current from an output voltage of the high voltage battery and supply the driving current to the motor while the motor operates. Additionally, while the high voltage battery is charged, the motor and the inverter may be configured to compensate for a power factor of the current rectified by the rectifier circuit, and the high voltage battery may be charged with an output current of the motor and the inverter.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
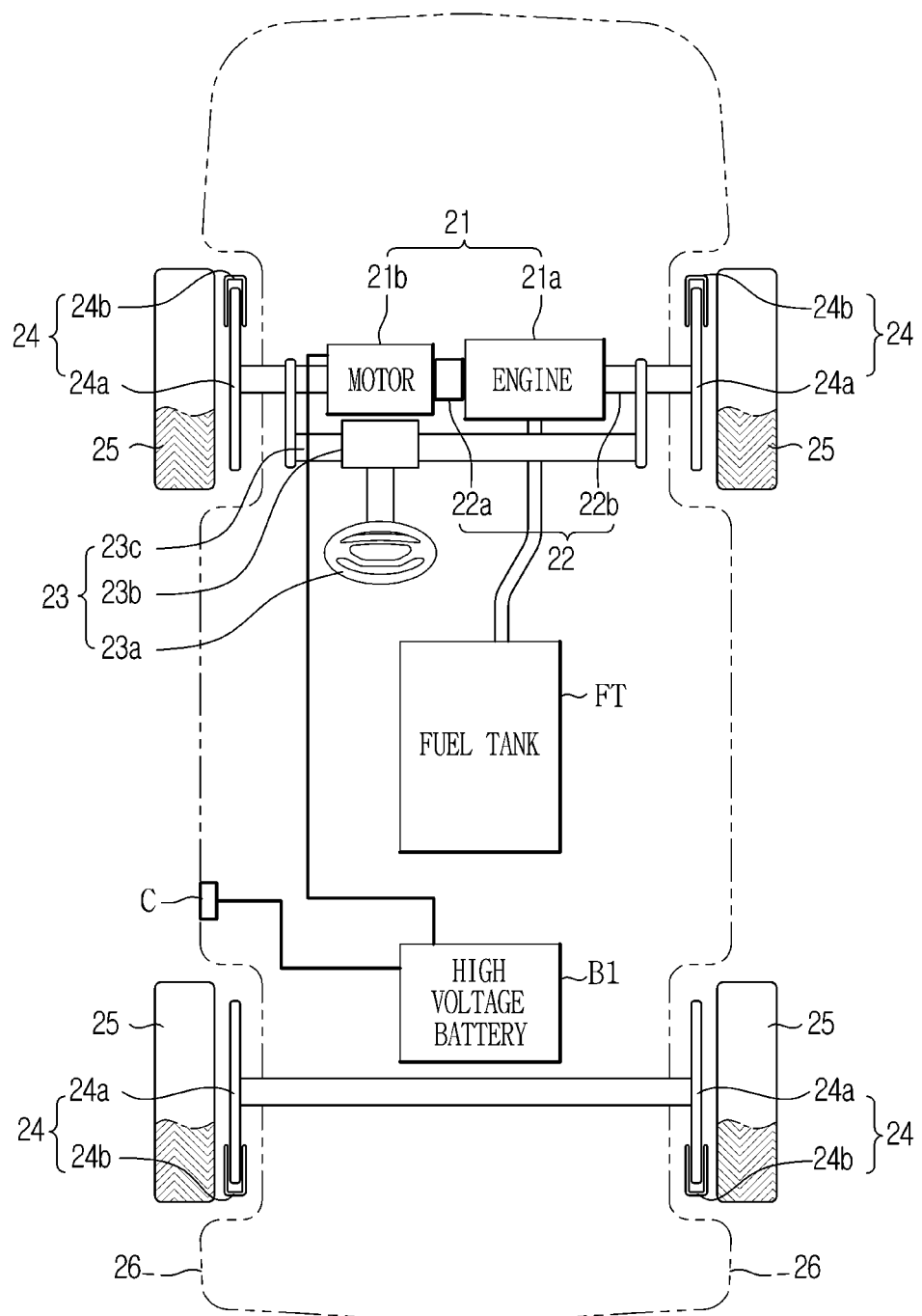
FIGS. 1 and 2 are views illustrating configurations of vehicles according to one exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These exemplary embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. Reference will now be made in detail to the exemplary embodiments of the present disclosure, examples of which are illustrated in the accompanying drawings, wherein like reference numerals refer to like elements throughout. The expression, "at least one of a, b, and c," should be understood as including only a, only b, only c, both a and b, both a and c, both b and c, or all of a, b, and c.

Hereinafter, an operation principle and exemplary embodiments of the disclosure will be described with respect to the accompanying drawings. A vehicle is a mechanical and/or electrical apparatus configured to transport people and/or objects using a rotational force of an engine and/or a motor. A vehicle using an engine may combust a fossil fuel such as gasoline, diesel, gas, and the like, convert a translational kinetic force generated during the combustion of the fossil fuel into a rotational kinetic force, and move using the converted rotational force. The vehicle using the engine may be supplied with the fossil fuel (for example, gasoline, diesel, and the like) from the outside.

A vehicle using a motor is refer to as an electric vehicle (EV), may convert electric energy stored in a battery into rotational kinetic energy, and move using the converted rotational force. The vehicle using the motor may be supplied with electrical power from the outside. Some vehicles use both engines and motors. Such a vehicle is referred to as a hybrid electric vehicle (HEV), may move using the engine and also move using the motor. The HEV may be classified into a general HEV configured to receive only a fossil fuel from the outside and generate electric energy using an engine and a motor (generator), and a plug-in HEV (PHEV) capable of receiving both a fossil fuel and electric energy from the outside.

Each of the EV and the HEV typically includes a high voltage battery configured to supply electric energy to a driving motor, and a low voltage battery configured to supply electric energy to electric parts of the vehicle. For example, the high voltage battery configured to supply the electric energy to the driving motor may have an output voltage of about several hundreds of volts (V, e.g., about 300 V to 400 V), and the low voltage battery configured to supply the electric energy to the electric parts may have an output voltage of several tens of volts (e.g., about 12 V).

The high voltage battery of each of the EV and the HEV may be charged while each of the EV and the HEV travels. The driving motor may be configured to convert electric energy into kinetic energy (a rotational force), and convert the kinetic energy (the rotational force) into electric energy. In other words, when the driving motor is supplied with electric energy from the outside, the driving motor may operate as a motor, and when the driving motor is supplied with kinetic energy from the outside, the driving motor may operate as a generator. Such a driving motor may be configured to generate electric power due to operation of the driving motor when the vehicle is being driven on a downhill road or a speed of the vehicle decreases (regenerative braking), and the high voltage battery may be charged with the electric power generated by the driving motor (charged by regenerative braking).

In addition, the high voltage battery of each of the EV and the HEV (particularly, the PHEV) may be charged from an external power source (e.g., a direct current (DC) power source or an alternating current (AC) power source). For example, a high voltage battery for a vehicle may be charged using a commercial DC power source in a battery charging station, and the high voltage battery for a vehicle may be charged using a home AC power source in a home. As described above, an additional charging circuit is required for charging the high voltage battery from an external power source. A vehicle according to one exemplary embodiment minimizes the additional charging circuit or removes the additional charging circuit.

Figure 2:
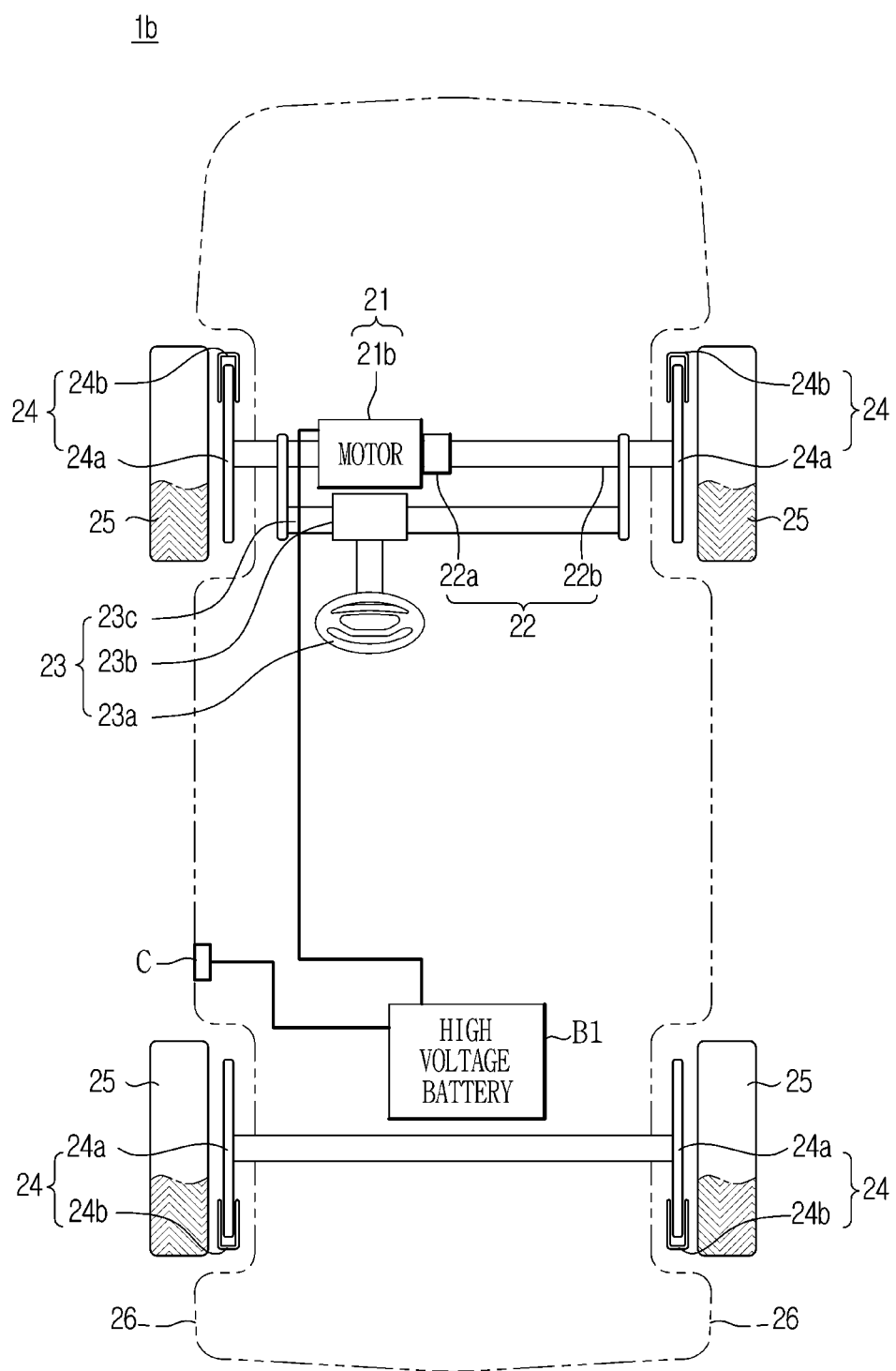

FIGS. 1 and 2 are views illustrating configurations of vehicles according to one exemplary embodiment. FIG. 1 is a view illustrating an example of an HEV (particularly, a PHEV). As illustrated in FIG. 1, a vehicle 1a may include a power generating apparatus 21 configured to generate power, a power transfer unit 22 configured to transfer the power, a steering unit 23 configured to adjust a traveling direction of the vehicle 1a, brakes 24 for stopping the vehicle 1a, and wheels 25 for moving the vehicle 1a. In addition, a chassis 20 may further include a frame 26 configured to fix the power generating apparatus 21, the power transfer unit 22, the steering unit 23, the brakes 24, and the wheels 25.

The power generating apparatus 21 may be configured to generate a rotational force for operating the vehicle 1a, and may include an engine 21a, a fuel tank FT, an exhaust, a motor 21b, a high voltage battery B1, a charging circuit C, and the like. The power transfer unit 22 may be configured to transfer a rotational force generated by the power generating apparatus 21 to the wheels 25, and may include a transmission 22a, a transmission lever, a differential gear, a driving shaft 22b, and the like. The steering unit 23 may adjust the traveling direction of the vehicle 1a, and includes a steering wheel 23a, a steering gear 23b, a steering link 23c, and the like.

Each of the brakes 24 stops rotation of s corresponding wheel 25, and includes a brake pedal, a master cylinder, a brake disc 24a, a brake pad 24b, and the like. The wheels 25 receive a rotational force from the power generating apparatus 21 through the power transfer unit 22 to thus move the vehicle 1a. The wheels 25 include front wheels disposed at a front of the vehicle and rear wheels disposed at a rear of the vehicle. The vehicle 1a may include both the engine 21a and the motor 21b for generating power (a rotational force). The vehicle 1a may also include the fuel tank FT configured to supply a fossil fuel to the engine 21a, and the high voltage battery B1 configured to supply electric power to the motor 21b. In addition, the charging circuit C configured to charge the high voltage battery B1 from an external power source may be provided.

FIG. 2 is a view illustrating an example of an EV. As illustrated in FIG. 2, a vehicle 1b may include a power generating apparatus 21, a power transfer unit 22, a steering unit 23, brakes 24, and wheels 25. The power transfer unit 22, the steering unit 23, the brakes 24, and the wheels 25 may be the same as those illustrated in FIG. 1. However, the power generating apparatus 21 may include a motor 21b, a high voltage battery B1, and a charging circuit C.

When compared to the vehicle 1a (the HEV) illustrated in FIG. 1, the vehicle 1b may omit an engine 21a, a fuel tank FT, and the like, and may include only the motor 21b, the high voltage battery B1, and the charging circuit C. As described above, the vehicles 1a and 1b according to exemplary embodiments commonly include the motor 21b, the high voltage battery B1, and the charging circuit C.

Figure 3:
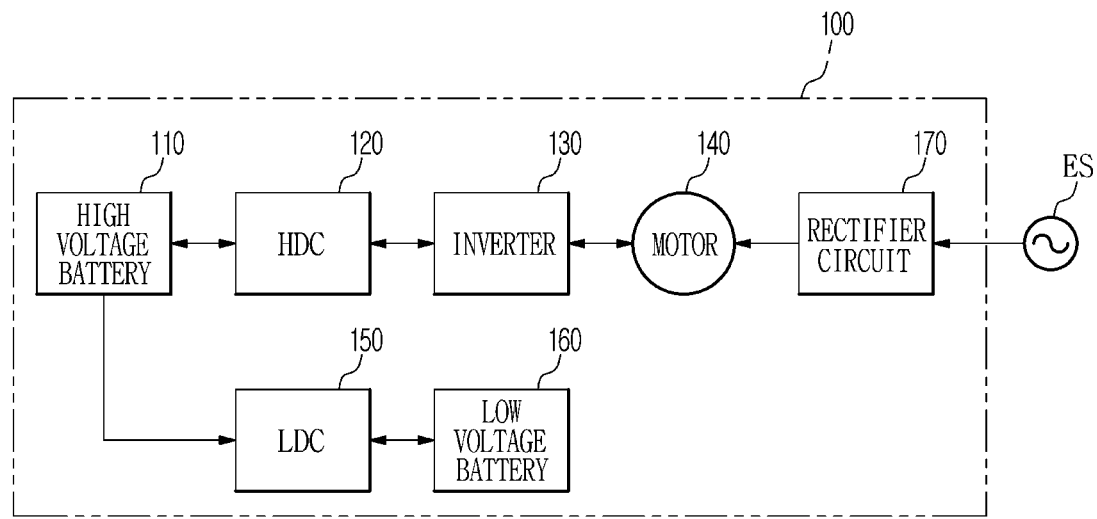
FIG. 3 is a view illustrating a motor driving and battery charging apparatus for a vehicle according to one exemplary embodiment.

Hereinafter, the motor 21b, the high voltage battery B1, and the charging circuit C of each of the vehicles 1a and 1b will be described in more detail. FIG. 3 is a view illustrating a motor driving and battery charging apparatus for a vehicle according to one exemplary embodiment. Referring to FIG. 3, a motor driving and battery charging apparatus 100 for a vehicle may include a high voltage battery 110, a high DC-DC convertor (HDC) 120, an inverter 130, a motor 140, a low DC-DC convertor (LDC) 150, a low voltage battery 160, and a rectifier circuit 170.

The high voltage battery 110 of the motor driving and battery charging apparatus 100 may be configured to supply electric energy, that is, driving power, to the motor 140 through the HDC 120 and the inverter 130 while the vehicle 1a or 1b is being driven. For efficient driving of the motor 140, the high voltage battery 110 may be configured to output, for example, a voltage in the range of about 300 V to 400 V, which is greater than that of the low voltage battery 160. In addition, the high voltage battery 110 may be supplied with electric power from an external power source ES or the motor 140 and may be configured to store electric energy converted from the received electric power. For example, while the vehicle 1a or 1b is being driven, the high voltage battery 110 may be supplied with electric power from the motor 140 due to regenerative braking. In addition, while the vehicle 1a or 1b is parked, the high voltage battery 110 may be supplied with electric power from the external power source ES.

The HDC 120 may be configured to increase a voltage of electric power output from the high voltage battery 110. Since the HDC 120 increases the voltage of the high voltage battery 110, an amount of driving current supplied to the motor 140 may be decreased, and thus the motor 140 may be efficiently operated. The inverter 130 may be configured to supply a driving current to the motor 140. Specifically, a DC voltage from the HDC 120 may be applied to the inverter 130, and the inverter 130 may be configured to output an AC current from the DC voltage to the motor 140. The inverter 130 may include a plurality of switches configured to allow or block a flow of the current, and the motor 140 may be supplied with the AC current through switching operations of the plurality of switches.

The motor 140 may be supplied with the driving current from the inverter 130 and may be configured to generate a rotational force for rotating the wheels 25 (see FIGS. 1 and 2). The motor 140 may include a stator fixed to the vehicle 1a or 1b and a rotor provided to be rotatable. A magnetic interaction may occur between the stator and the rotor due to the driving current, and thus the rotor may be rotated due to the magnetic interaction between the stator and the rotor. In addition, the motor 140 may be configured to generate electric power. For example, when a driver decreases a speed of the vehicle 1a or 1b or when the vehicle 1a or 1b is traveling on a downhill road, the motor 140 may be configured to generate electric power.

When the rotor of the motor 140 rotates while the inverter 130 does not operate, an electromotive force may be generated due to a magnetic interaction between the rotor and the stator. A regenerative current may be supplied from the motor 140 to the inverter 130 due to the electromotive force. The regenerative current generated by the motor 140 may be an AC current, and the inverter 130 may operate as a rectifier configured to convert the AC current into a DC current. As described above, the regenerative current may be converted into the DC current by the inverter 130 and supplied to the high voltage battery 110 through the HDC 120. The high voltage battery 110 may be configured to store electric power as electric energy due to the regenerative current.

The low voltage battery 160 may be configured to supply electric power to electric parts of the vehicle 1a or 1b. A voltage of about 12 V may be applied to the electric parts based on a standardized specification. Accordingly, the low voltage battery 160 may be configured to output a voltage, for example, in the range of about 12 V to 14 V, which is less than that of the high voltage battery 110. The LDC 150 may be configured to reduce a voltage of the electric power output from the high voltage battery 110. The voltage reduced by the LDC 150 may be applied to the low voltage battery 160, and a current output from the LDC 150 may be supplied to the low voltage battery 160. In other words, a voltage of the electric power output from the high voltage battery 110 may be reduced by the LDC 150, and the electric power may be supplied to the low voltage battery 160. The rectifier circuit 170 may be configured to receive electric power from the external power source ES and transfer the electric power to the high voltage battery 110.

As described above, the high voltage battery 110 may be charged by a DC or AC power source. When the high voltage battery 110 is charged by a DC power source, DC electric power may be directly supplied from the external power source ES to the high voltage battery 110. However, when the high voltage battery 110 is charged by an AC power source, AC electric power supplied from the external power source ES may be converted into DC electric power, and the converted DC electric power may be supplied to the high voltage battery 110. Accordingly, the rectifier circuit 170 may include a filter configured to block harmonic components included in AC electric power, and a rectifier (e.g., a diode bridge) configured to convert the AC electric power into DC electric power.

While the high voltage battery 110 is being charged, the motor 140 and the inverter 130 may be configured to increase a power factor. In other words, the motor 140 and the inverter 130 may be configured to perform power factor correction (PFC). In addition, while the high voltage battery 110 is being charged, the HDC 120 and the LDC 150 may be configured to change a voltage of the external power source ES. In other words, the HDC 120 and the LDC 150 may jointly function as a DC-DC converter.

Figure 4:
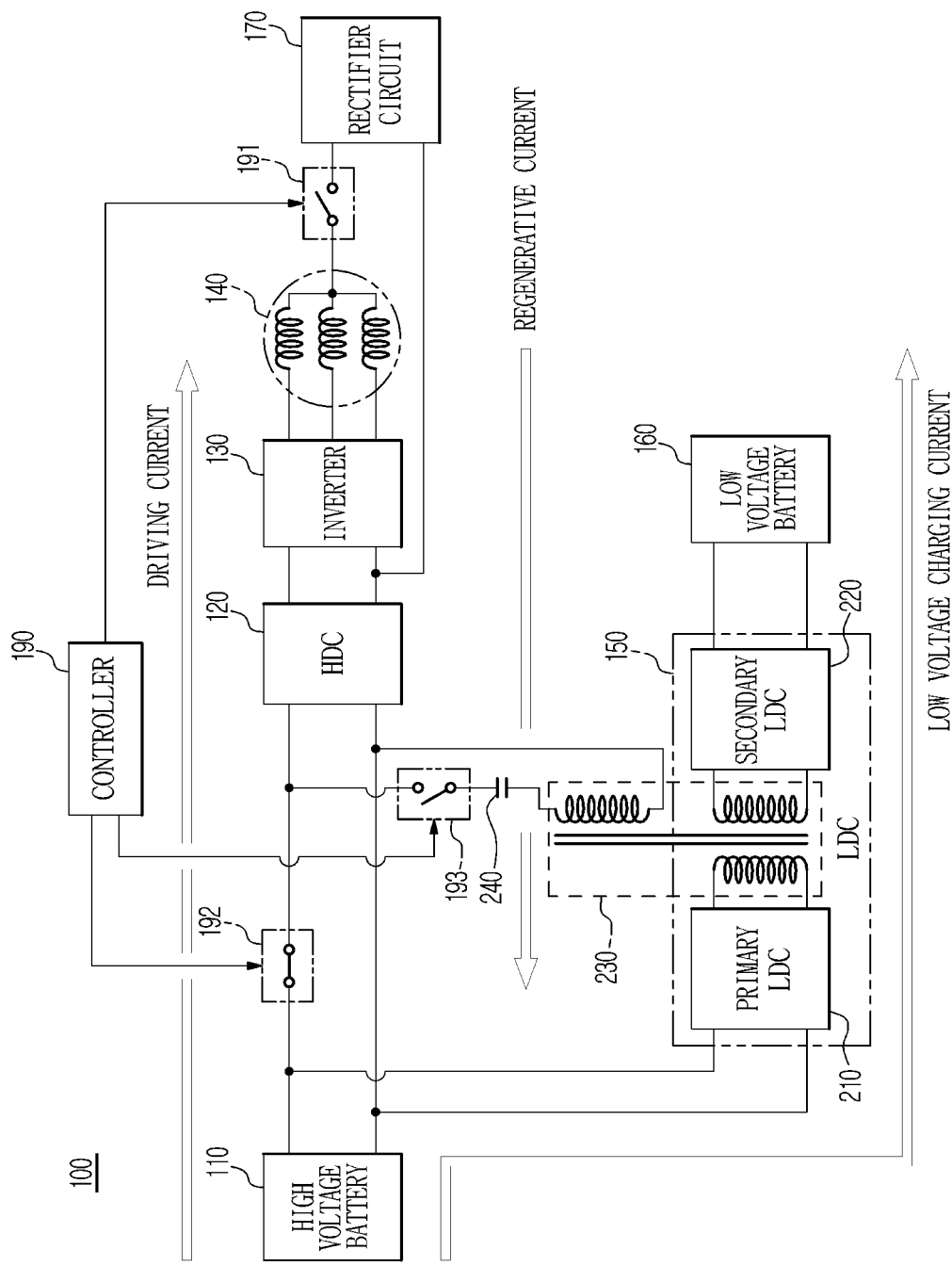
FIGS. 4 and 5 are views illustrating an operation of the motor driving and battery charging apparatus for a vehicle while the vehicle is being driven according to one exemplary embodiment.
Figure 5:
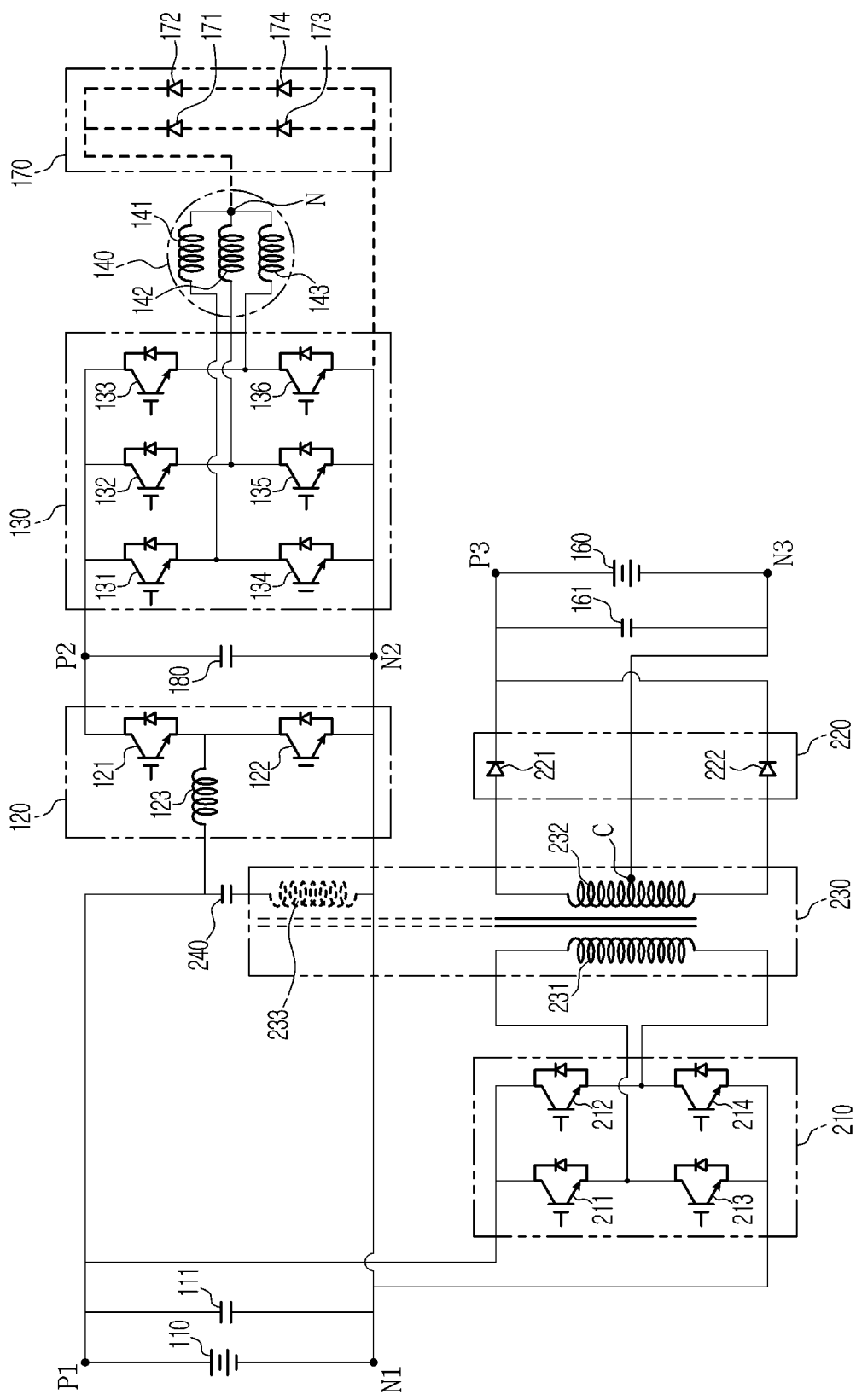

Hereinafter, an operation of the motor driving and battery charging apparatus 100 while the vehicle 1a or 1b is being driven and an operation of the motor driving and battery charging apparatus 100 while the vehicle 1a or 1b is parked will be described. FIGS. 4 and 5 are views illustrating an operation of the motor driving and battery charging apparatus for a vehicle while the vehicle is traveling according to one exemplary embodiment. Referring to FIGS. 4 and 5, the motor driving and battery charging apparatus 100 for a vehicle may include the high voltage battery 110, the HDC 120, a DC link capacitor 180, the inverter 130, the motor 140, the LDC 150, the low voltage battery 160, and the rectifier circuit 170.

The high voltage battery 110 may include a first positive electrode P1 and a first negative electrode N1, and a high voltage capacitor 111 may be connected between the first positive electrode P1 and the first negative electrode N1 of the high voltage battery 110. The high voltage capacitor 111 may be configured to stabilize a voltage between both of the electrodes P1 and N1 of the high voltage battery 110. In other words, the high voltage capacitor 111 may remove a ripple included in a voltage input to the high voltage battery 110. The DC link capacitor 180 may be disposed between a second positive electrode P2 and a second negative electrode N2. The DC link capacitor 180 may be configured to stabilize a voltage increased by the HDC 120 while the motor 140 operates, or stabilize a voltage rectified by the inverter 130 while the motor 140 generates electricity.

The HDC 120 may include an upper high DC-DC switch 121, a lower high DC-DC switch 122, and a high DC-DC inductor 123. The upper high DC-DC switch 121 and the lower high DC-DC switch 122 may be connected in series between the second positive electrode P2 and the second negative electrode N2. Each of the high DC-DC switches 121 and 122 may include a transistor and a freewheeling diode, and may be formed as an insulated gate bipolar mode transistor (IGBT) or a metal-oxide-semiconductor field-effect transistor (MOSFET). The high DC-DC inductor 123 may be connected between the first positive electrode P1 of the high voltage battery 110 and a connecting node between the upper high DC-DC switch 121 and the lower high DC-DC switch 122.

While the motor 140 operates, the HDC 120 may be configured to increase an output voltage of the high voltage battery 110 through switching operations of the high DC-DC switches 121 and 122 and output the increased voltage to the DC link capacitor 180. For example, while the motor 140 operates, the upper high DC-DC switch 121 may be turned off, and the lower high DC-DC switch 122 may be repeatedly turned on (closed) and off (opened). As a result, the HDC 120 may operate as a boost converter circuit. While the motor 140 generates electricity, the HDC 120 may be configured to reduce an output voltage of the DC link capacitor 180 through switching operations of the high DC-DC switches 121 and 122 and output the reduced voltage to the high voltage capacitor 111 and the high voltage battery 110. For example, while the motor 140 generates electricity, the lower high DC-DC switch 122 may be turned off, and the upper high DC-DC switch 121 be may repeatedly turned on and off. As a result, the HDC 120 may operate as a buck converter circuit.

The inverter 130 may include a first upper driving switch 131, a second upper driving switch 132, a third upper driving switch 133, a first lower driving switch 134, a second lower driving switch 135, and a third lower driving switch 136. The first upper driving switch 131 and the first lower driving switch 134 may be connected in series between the second positive electrode P2 and the second negative electrode N2, the second upper driving switch 132 and the second lower driving switch 135 may be connected in series between the second positive electrode P2 and the second negative electrode N2, and the third upper driving switch 133 and the third lower driving switch 136 may be connected in series between the second positive electrode P2 and the second negative electrode N2. Each of the driving switches 131 to 136 of the inverter 130 may include a transistor and a freewheeling diode, and may be formed as an IGBT or a MOSFET.

The motor 140 may include a stator having an a-phase coil 141, a b-phase coil 142, and a c-phase coil 143, and a rotor having a permanent magnet. The a-phase coil 141 may be connected between a neutral point N of the motor 140 and a connecting node between the first upper driving switch 131 and the first lower driving switch 134, the b-phase coil 142 may be connected between the neutral point N of the motor 140 and a connecting node between the second upper driving switch 132 and the second lower driving switch 135, and the c-phase coil 143 may be connected between the neutral point N of the motor 140 and a connecting node between the third upper driving switch 133 and the third lower driving switch 136.

While the motor 140 operates, the inverter 130 may be configured to generate an AC current from a DC voltage of the DC link capacitor 180 through switching operations of the driving switches 131 to 136 and supply the AC current (e.g., a driving current of the motor) to the a-, b-, and c-coils 141, 142, and 143 of the motor 140. For example, when the first upper driving switch 131 is turned on and the first lower driving switch 134 is turned off, a positive current may be supplied to the a-phase coil 141 of the motor 140, and when the first upper driving switch 131 is turned off and the first lower driving switch 134 is turned on, a negative current may be supplied to the a-phase coil 141 of the motor 140. In addition, when an AC current flows through the a-, b-, and c-coils 141, 142, and 143 of the motor 140, the rotor of the motor 140 may be rotated due to an magnetic interaction between the a-, b-, and c-coils 141, 142, and 143 and the permanent magnet.

While the motor 140 generates electricity, the inverter 130 may be configured to rectify an AC current output from the motor 140 and output the rectified current to the DC link capacitor 180. For example, when the motor 140 rotates, an electromotive force may be generated at the a-, b-, and c-coils 141, 142, and 143 due to the magnetic interaction between the a-, b-, and c-coils 141, 142, and 143 and the permanent magnet, and an AC current (e.g., a rotating current) may be supplied to the inverter 130 from the a-, b-, and c-coils 141, 142, and 143 due to the electromotive force. In particular, when the driving switches 131 to 136 of the inverter 130 are turned off, a diode bridge may be formed with the freewheeling diodes of the driving switches 131 to 136, and the diode bridge formed with the freewheeling diodes may rectify the AC current.

The rectifier circuit 170 may include a diode bridge configured to rectify an AC current supplied from the external power source ES. The rectifier circuit 170 may include a first upper charging diode 171, a second upper charging diode 172, a first lower charging diode 173, and a second lower charging diode 174. The first upper charging diode 171 and the first lower charging diode 173 may be connected in series between the neutral point N of the motor 140 and the second negative electrode N2, and the second upper charging diode 172 and the second lower charging diode 174 may be connected in series between the neutral point N of the motor 140 and the second negative electrode N2. In addition, the external power source ES may be connected between a connecting node between the first upper charging diode 171 and the first lower charging diode 173 and a connecting node between the second upper charging diode 172 and the second lower charging diode 174.

The rectifier circuit 170 may be configured to rectify an AC current of the external power source ES and output the rectified current to the motor 140 and the inverter 130. For example, the first upper charging diode 171 and the second upper charging diode 172 may allow a current to be input only from the external power source ES to the neutral point N of the motor 140, and the first lower charging diode 173 and the second lower charging diode 174 may allow a current to be output only from the second negative electrode N2 to the external power source ES.

The low voltage battery 160 may include a third positive electrode P3 and a third negative electrode N3, and a low voltage capacitor 161 may be connected between the third positive electrode P3 and the third negative electrode N3 of the low voltage battery 160. The low voltage capacitor 161 may be configured to stabilize a voltage between both of the electrodes P3 and N3 of the low voltage battery 160. In other words, the low voltage capacitor 161 may remove a ripple included in a voltage input to the low voltage battery 160.

The LDC 150 may include a primary transformer circuit (hereinafter, referred to as a "full bridge circuit") 210, a secondary circuit (hereinafter, referred to as a "low DC-DC rectifier circuit") 220, and a three winding transformer 230. The three winding transformer 230 may include a first coil 231, a second coil 232, and a third coil 233, the first coil 231 may be connected to the full bridge circuit 210 of the LDC 150, the second coil 232 may be connected to the low DC-DC rectifier circuit 220 of the LDC 150, and the third coil 233 may be connected to the HDC 120. The full bridge circuit 210 may include a first upper low DC-DC switch 211, a second upper low DC-DC switch 212, a first lower low DC-DC switch 213, and a second lower low DC-DC switch 214. Each of the low DC-DC switches 211 to 214 may include a transistor and a freewheeling diode, and may be formed as an IGBT or a MOSFET.

The first upper low DC-DC switch 211 and the first lower low DC-DC switch 213 may include connected in series between the first positive electrode P1 and the first negative electrode N1 of the high voltage battery 110, and the second upper low DC-DC switch 212 and the second lower low DC-DC switch 214 may be connected in series between the first positive electrode P1 and the first negative electrode N1 of the high voltage battery 110. In addition, a connecting node between the first upper low DC-DC switch 211 and the first lower low DC-DC switch 213 may be connected to a first end of the first coil 231, and a connecting node between the second upper low DC-DC switch 212 and the second lower low DC-DC switch 214 may be connected to a second end of the first coil 231. In other words, the first upper low DC-DC switch 211, the second upper low DC-DC switch 212, the first lower low DC-DC switch 213, the second lower low DC-DC switch 214, and the first coil 231 may form an H-bridge.

The full bridge circuit 210 may be configured to generate an AC current from a DC voltage of the high voltage battery 110 through switching operations of the low DC-DC switches 211 to 214 and supply the AC current to the first coil 231 of the three winding transformer 230. For example, when the first upper low DC-DC switch 211 is turned on and the first lower low DC-DC switch 213 is turned off, a positive current may be supplied to the first coil 231, and when the first upper low DC-DC switch 211 is turned off and the first lower low DC-DC switch 213 is turned on, a negative current may be supplied to the first coil 231.

The low DC-DC rectifier circuit 220 may include a first rectifier diode 221 and a second rectifier diode 222. The first rectifier diode 221 may be connected between a first end of the second coil 232 of the three winding transformer 230 and the third positive electrode P3 of the low voltage battery 160, and the second rectifier diode 222 may be connected between a second end of the second coil 232 of the three winding transformer 230 and the third positive electrode P3 of the low voltage battery 160. In addition, a central point C of the second coil 232 may be connected to the third negative electrode N3 of the low voltage battery 160. The low DC-DC rectifier circuit 220 may be configured to rectify an AC current of the second coil 232 and output the rectified current to the low voltage capacitor 161 and the low voltage battery 160. For example, the first rectifier diode 221 and the second rectifier diode 222 may allow a current to be supplied only from the second coil 232 to the third positive electrode P3 of the low voltage battery 160.

The three winding transformer 230 may be configured to reduce a voltage of the high voltage battery 110 based on a ratio between the number of turns of the first coil 231 and the number of turns of the second coil 232, and output the reduced voltage to the low voltage battery 160. In addition, the three winding transformer 230 may electrically isolate the high voltage battery 110 from the low voltage battery 160. As a result, a failure of the high voltage battery 110 may be prevented from affecting the low voltage battery 160 and electric parts.

The third coil 233 of the three winding transformer 230 may be connected to an input of the HDC 120, and a resonant capacitor 240 may be disposed between the third coil 233 and the HDC 120. In particular, a first end of the third coil 233 may be connected to the positive electrode P1 of the high voltage battery 110 through the resonant capacitor 240, and a second end of the third coil 233 may be connected to the negative electrode N1 of the high voltage battery 110. The third coil 233 and the resonant capacitor 240 may be configured to generate an AC current together with the HDC 120 while the high voltage battery 110 is charged by the external power source ES, which will be described below. Operations of the third coil 233 and the resonant capacitor 240 will be described in more detail.

The motor driving and battery charging apparatus 100 for a vehicle may further include a first switch 191 disposed between the neutral point N of the motor 140 and the rectifier circuit 170, a second switch 192 disposed between the high voltage battery 110 and the HDC 120, a third switch 193 disposed between the third coil 233 and the HDC 120, and a controller 190 configured to operate the first, second, and third switches 191 to 193 to be turned on and off.

The controller 190 may be configured to turn the first switch 191, the second switch 192, and the third switch 193 on or off based on a running or parking state of the vehicle 1a or 1b. For example, while the vehicle 1a or 1b is being operated, the controller 190 may be configured to turn the second switch 192 on and turn the first switch 191 and the third switch 193 off. In addition, while the vehicle 1a or 1b is parked and being charged, the controller 190 may be configured to turn the second switch 192 off and turn the first switch 191 and the third switch 193 on. While the vehicle 1a or 1b is being operated, the second switch 192 may be turned on and the first switch 191 and the third switch 193 may be turned off, as illustrated in FIG. 4, and a motor driving circuit may be formed as illustrated in FIG. 5.

Since the second switch 192 is turned on, the high voltage battery 110 may be directly connected to the HDC 120, and since the first switch 191 is turned off, the motor 140 may be separated from the rectifier circuit 170. In addition, since the third switch 193 is turned off, the HDC 120 may be separated from the three winding transformer 230. The high voltage battery 110 may be configured to output high voltage DC electric power. The HDC 120 may be configured to increase a voltage of the high voltage battery 110 and output the increased voltage to the DC link capacitor 180. For example, the upper high DC-DC switch 121 of the HDC 120 may be turned off, and the lower high DC-DC switch 122 may be repeatedly turned on and off.

The inverter 130 may be configured to generate an AC current from the DC voltage of the DC link capacitor 180 and supply the AC current (e.g., a driving current) to the motor 140. For example, the driving switches 131 to 136 of the inverter 130 may be repeatedly turned on and off in an alternating pattern. The motor 140 may be supplied with the driving current from the inverter 130 and may be configured to rotate the wheels 25 (see FIGS. 1 and 2). In addition, the motor 140 may be configured to generate a regenerative current using an external force (e.g., rotation of the wheels) and output the regenerative current to the inverter 130.

The inverter 130 may be configured to rectify the regenerative current of the motor 140 and output the rectified current to the DC link capacitor 180. For example, the driving switches 131 to 136 of the inverter 130 may be turned off, and a rectifier circuit may be formed with the freewheeling diodes of the driving switches 131 to 136. The HDC 120 may be configured to increase a voltage of the DC link capacitor 180, and output the increased voltage to the high voltage battery 110. For example, the upper high DC-DC switch 121 of the HDC 120 may be repeatedly turned on and off, and the lower high DC-DC switch 122 may be turned off. The high voltage battery 110 may be charged with the regenerative current. The LDC 150 may be configured to decrease a voltage of the high voltage battery 110, and output the decreased voltage to the low voltage battery 160. For example, the low DC-DC switches 211 to 214 of the full bridge circuit 210 may be repeatedly turned on and off in an alternating pattern. The low voltage battery 160 may be configured to supply low voltage DC electric power to the electric parts of the vehicle 1a or 1b.

Figure 6:
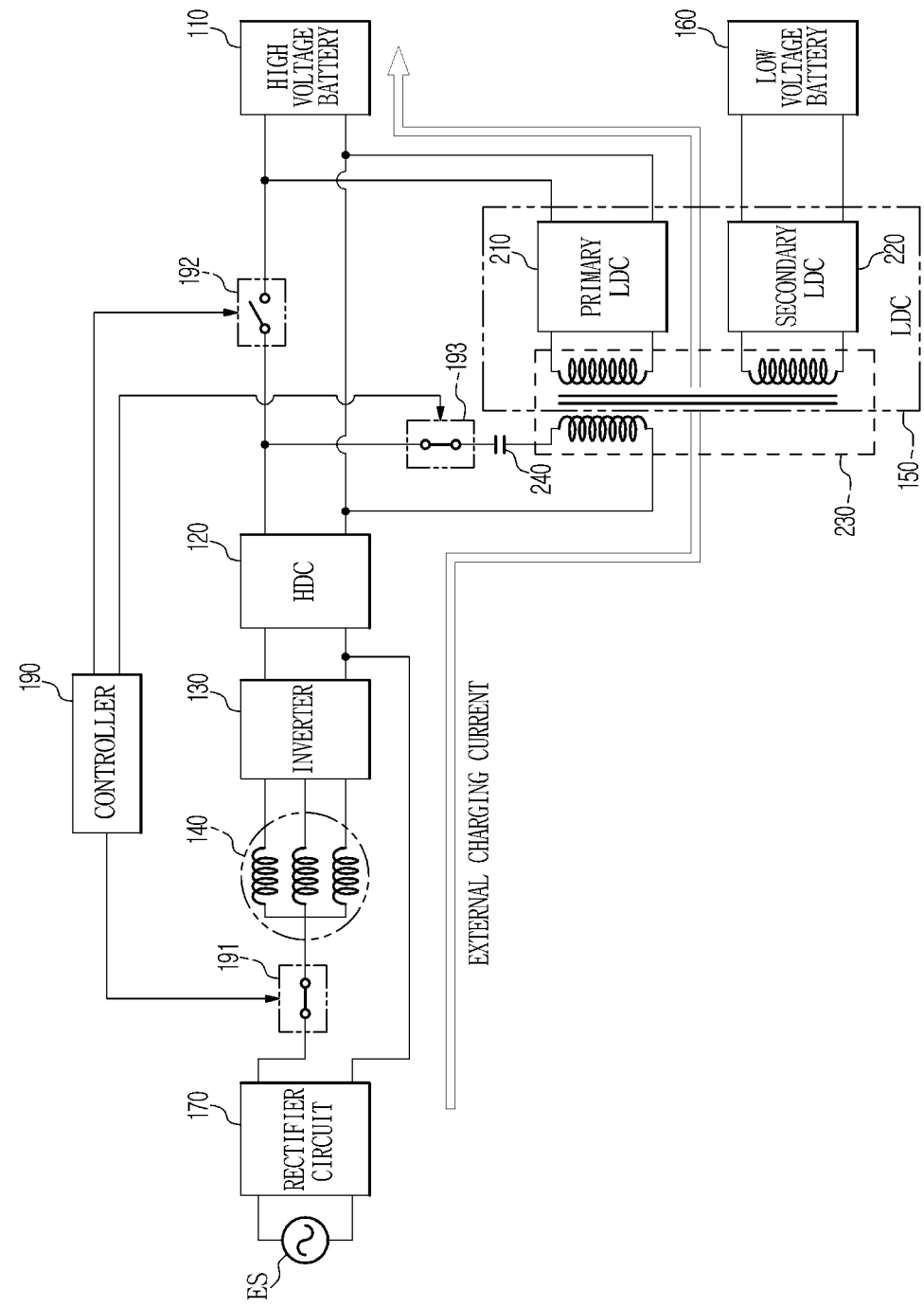
FIGS. 6 and 7 are views illustrating an operation of the motor driving and battery charging apparatus for a vehicle while the vehicle is parked according to one exemplary embodiment.
Figure 7:
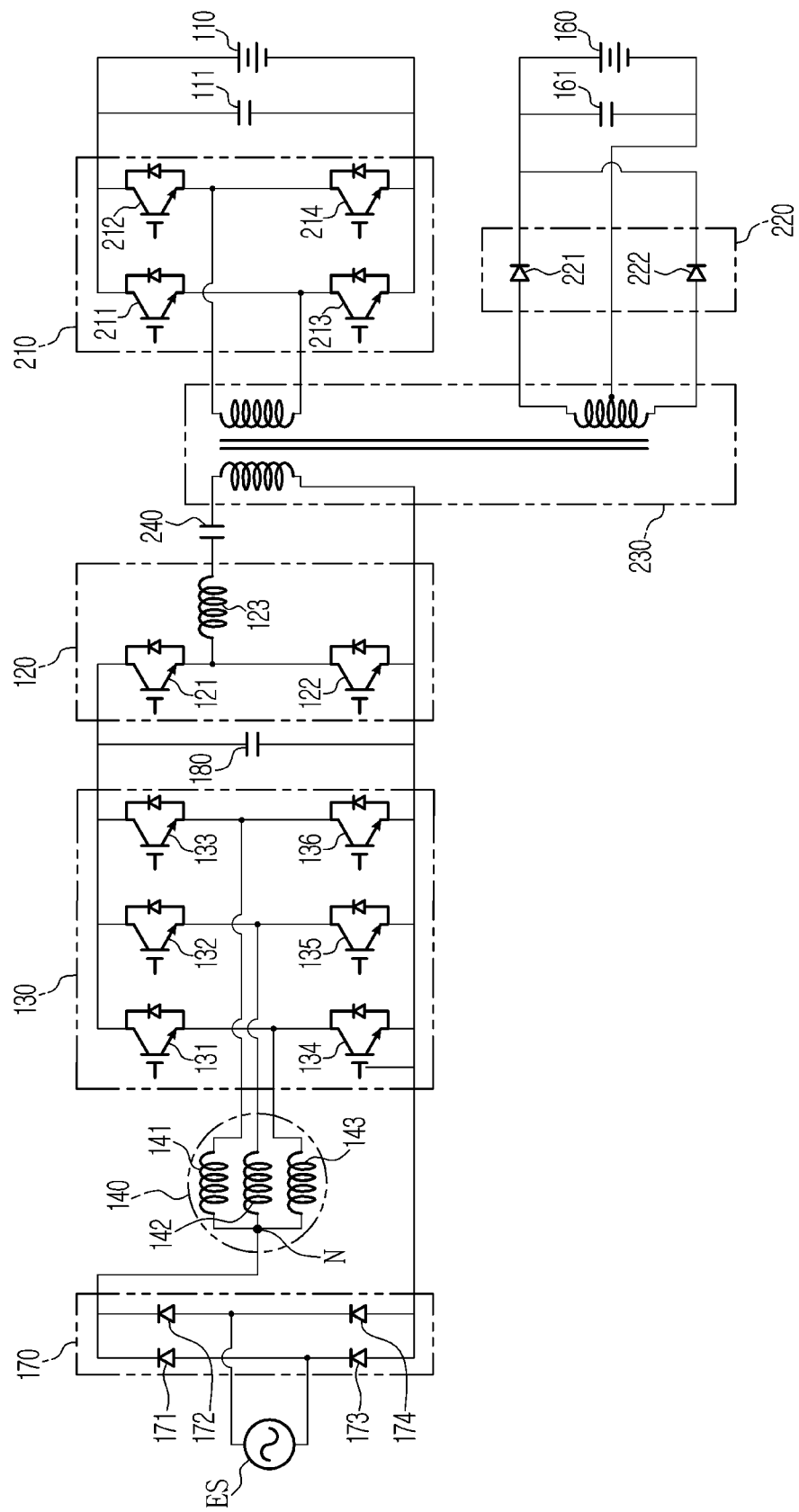
Figure 8:
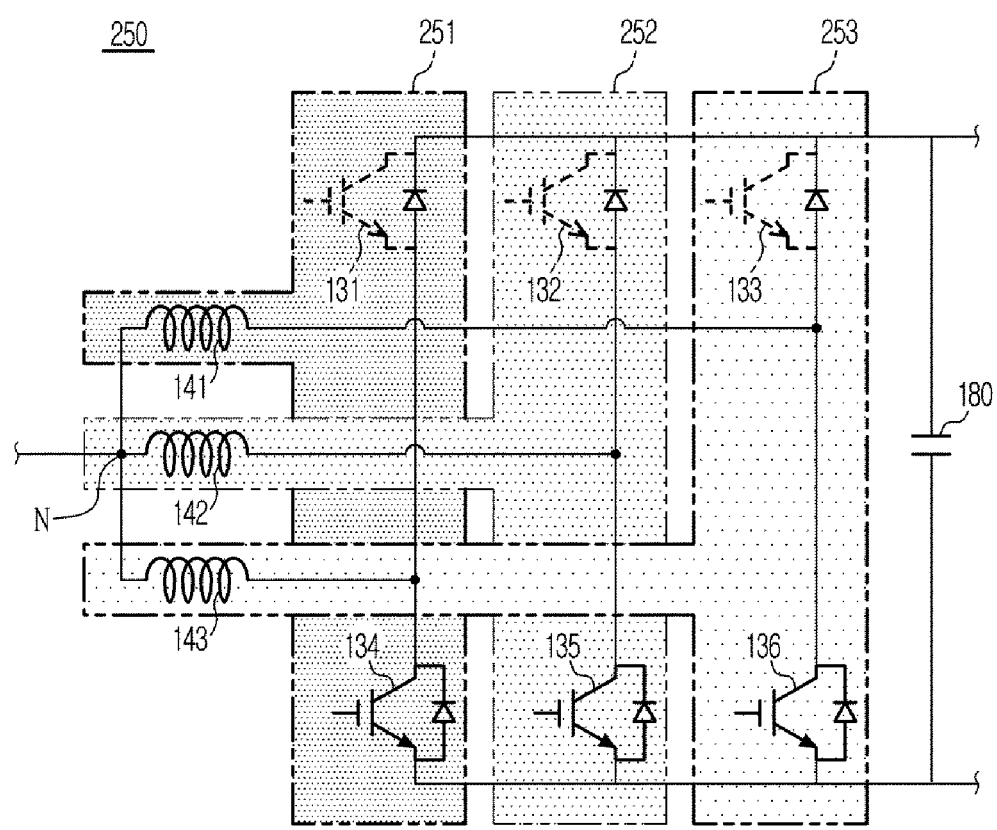
FIG. 8 is a view illustrating operations of a motor and an inverter while the vehicle is parked according to one exemplary embodiment.
Figure 9:
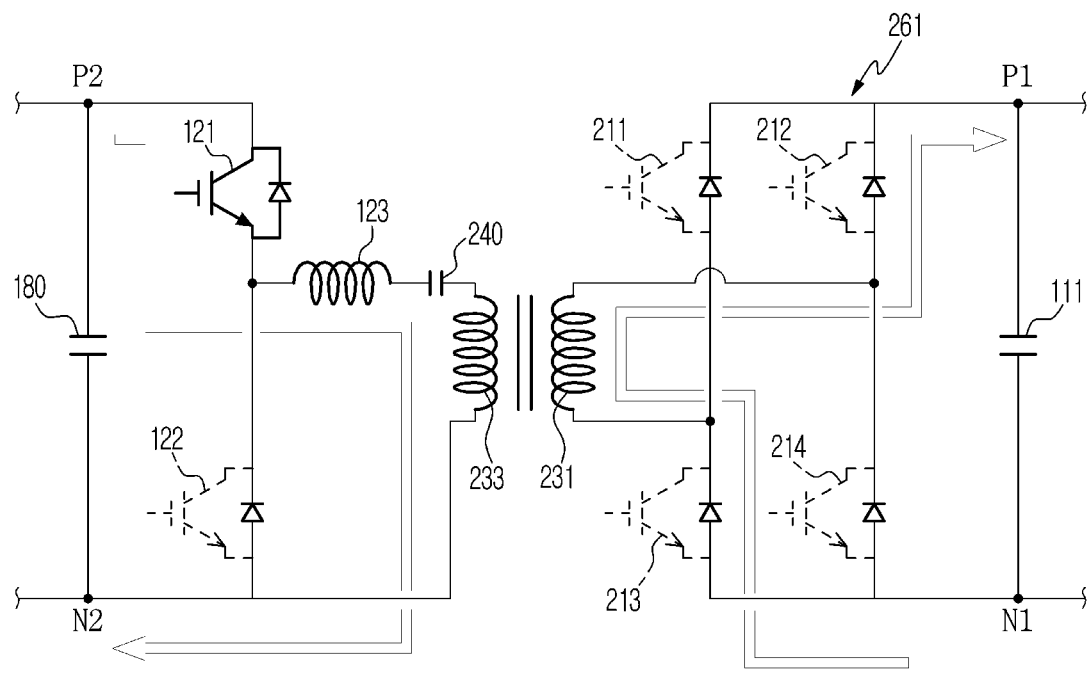
FIGS. 9 and 10 are views illustrating operations of a high direct current (DC)-DC convertor (HDC) and a low DC-DC convertor (LDC) while the vehicle is parked according to one exemplary embodiment.
Figure 10:
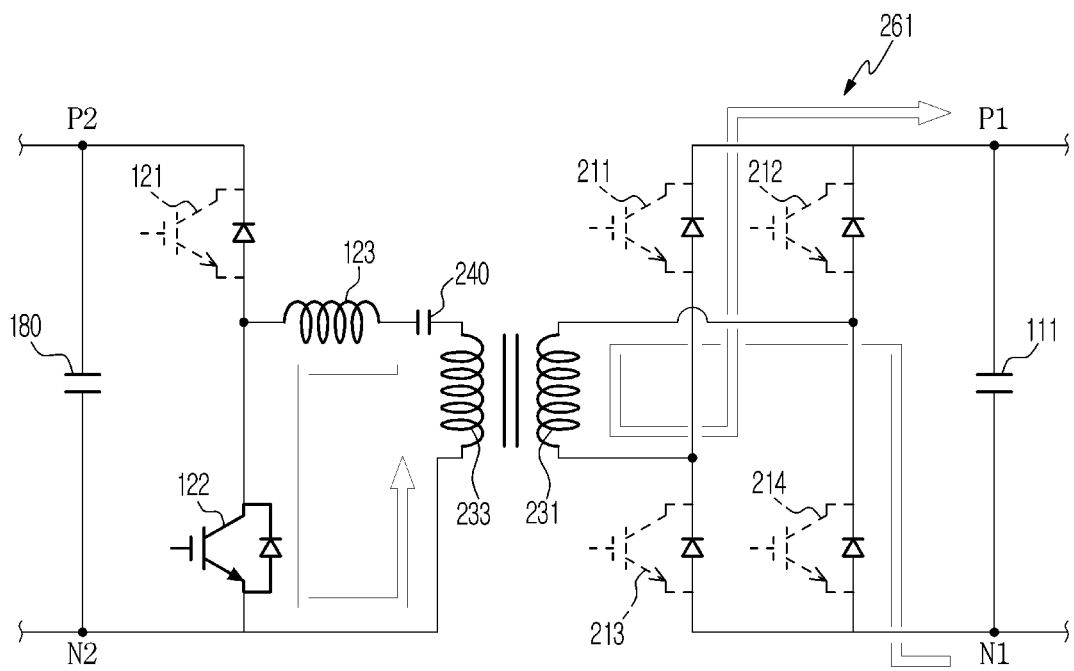

FIGS. 6 and 7 are views illustrating an operation of the motor driving and battery charging apparatus for a vehicle while the vehicle is parked according to one exemplary embodiment, FIG. 8 is a view illustrating operations of a motor and an inverter while the vehicle is parked according to one exemplary embodiment, and FIGS. 9 and 10 are views illustrating operations of an HDC and an LDC while the vehicle is parked according to one exemplary embodiment. To facilitate understanding, the motor driving and battery charging apparatus 100 will be illustrated in FIG. 6 as having right and left sides mirrored in comparison to FIG. 4.

While the vehicle 1a or 1b is parked and being charged, the controller 190 may be configured to turn the second switch 192 off and turn the first switch 191 and the second switch 192 on, as illustrated in FIG. 6. When the second switch 192 is turned off and the first switch 191 and the third switch 193 are turned on, a battery charging circuit may be formed as illustrated in FIG. 7. Since the first switch 191 is turned on, the rectifier circuit 170 may be connected to the neutral point N of the motor 140. In addition, since the second switch 192 is turned off, the high voltage battery 110 may be separated from the HDC 120, and since the third switch 193 is turned on, the HDC 120 may be connected to the three winding transformer 230. As a result, the high voltage battery 110 may be connected to the HDC 120 through the full bridge circuit 210 and the three winding transformer 230.

The rectifier circuit 170 may be configured to rectify an AC current of the external power source ES and output the rectified current to the motor 140 and the inverter 130. For example, the rectifier circuit 170 may allow a current to be input only from the external power source ES to the neutral point N of the motor 140, and the second negative electrode N2 may allow a current to be output to the external power source ES. The motor 140 and the inverter 130 may be configured to increase a power factor of the AC electric power supplied from the external power source ES. Power factor refers to a ratio of effective electric power to supplied electric power. When AC electric power is supplied to the vehicle 1a or 1b, reactive power may be generated due to a difference between a phase of AC voltage and that of an AC current, and may not charge the high voltage battery 110. As the reactive power increases, the power factor decreases.

Further, the motor 140 and the inverter 130 may be configured to decrease the reactive power and increase the power factor. In other words, the motor 140 and the inverter 130 may be configured to decrease a difference between a phase of AC voltage and that of an AC current. For example, while the vehicle 1a or 1b is parked and being charged, the upper driving switches 131 to 136 of the inverter 130 may be turned off. When the upper driving switches 131 to 136 are turned off, the motor 140 and inverter 130 may be simplified as illustrated in FIG. 8.

Referring to FIG. 8, the a-, b-, and c-coils 141, 142, and 143, the freewheeling diodes of the upper driving switches 131 to 136, and the lower driving switches 131 to 136 may form a power factor corrector 250. In particular, the a-phase coil 141, the first upper driving switch 131, and the first lower driving switch 134 may form a first power factor corrector 251, the b-phase coil 142, the second upper driving switch 132, and the second lower driving switch 135 may form a second power factor corrector 252, and the c-phase coil 143, the third upper driving switch 133, and the third lower driving switch 136 may form a third power factor corrector 253. As described above, the motor 140 and the inverter 130 may form the power factor corrector 250 having a three-phase interleave.

The lower driving switches 131 to 136 may be repeatedly turned on and off, and the power factor corrector 250 may be configured to output a current having a phase identical to that of the AC voltage of the external power source ES to the DC link capacitor 180 due to the repeated turning on and off of the lower driving switches 131 to 136. The DC link capacitor 180 may be charged with the output current of the power factor corrector 250. As a result, electric energy of the external power source ES may be transferred to the DC link capacitor 180 through the motor 140 and the inverter 130.

The HDC 120, the three winding transformer 230, and the full bridge circuit 210 may form an isolated DC-DC converter 260. In particular, the HDC 120 may be configured to generate an AC current from the DC voltage of the DC link capacitor 180, and the three winding transformer 230 may be configured to transfer the AC current to the full bridge circuit 210 using an inductance therebetween. The full bridge circuit 210 may be configured to rectify the AC current output from the three winding transformer 230 and output the rectified current to the high voltage capacitor 111 and the high voltage battery 110. For example, while the vehicle 1*a* or 1*b* is parked and being charged, the low DC-DC switches 211 to 214 of the full bridge circuit 210 may be turned off. When the low DC-DC switches 211 to 214 are turned off, a diode bridge 261 may be formed with freewheeling diodes of the low DC-DC switches 211 to 214, as illustrated in FIGS. 9 and 10.

In addition, while the vehicle 1*a* or 1*b* is parked and being charged, the high DC-DC switches 121 and 122 of the HDC 120 may be repeatedly alternately turned on and off. When the high DC-DC switches 121 and 122 are repeatedly turned on and off in an alternating pattern, the third coil 233 may be supplied with an AC current, as illustrated in FIGS. 9 and 10. When the upper high DC-DC switch 121 is turned on and the lower high DC-DC switch 122 is turned off, a current may be supplied to the resonant capacitor 240 and the third coil 233 from the DC link capacitor 180, as illustrated in FIG. 9. The current may flow from the second positive electrode P2 of the DC link capacitor 180 to the resonant capacitor 240 through the upper high DC-DC switch 121 and the high DC-DC inductor 123. In addition, the current may flow to the second negative electrode N2 of the DC link capacitor 180 through the third coil 233.

In addition, when the upper high DC-DC switch 121 is turned off and the lower high DC-DC switch 122 is turned on, a current may flow from the resonant capacitor 240 to the third coil 233, as illustrated in FIG. 10. The current may flow from the resonant capacitor 240 to the third coil 233 through the high DC-DC inductor 123 and the lower high DC-DC switch 122. As described above, since the upper high DC-DC switch 121 and the lower high DC-DC switch 122 are alternately turned on and off, the third coil 233 may be supplied with an AC current whose magnitude and direction are changed.

The AC current of the third coil 233 may be transferred to the first coil 231 of the full bridge circuit 210. The three winding transformer 230 including the third coil 233 and the first coil 231 may electrically isolate the external power source ES from the high voltage battery 110. As a result, a failure of the external power source ES may be prevented from affecting the high voltage battery 110. The diode bridge 261 of the full bridge circuit 210 allows a current to flow only from the first coil 231 to the first positive electrode P1 of the high voltage capacitor 111, and allows a current to flow only from the first negative electrode N1 of the high voltage capacitor 111 to the first coil 231. As a result, electric energy of the DC link capacitor 180 may be transferred to the high voltage battery 110 through the HDC 120, the three winding transformer 230, and the full bridge circuit 210, and the high voltage battery 110 is charged. As described above, electric power of the external power source ES may be supplied to the high voltage battery 110 through the motor 140, the inverter 130, the DC link capacitor 180, the HDC 120, the three winding transformer 230, and the full bridge circuit 210.

Figure 11:
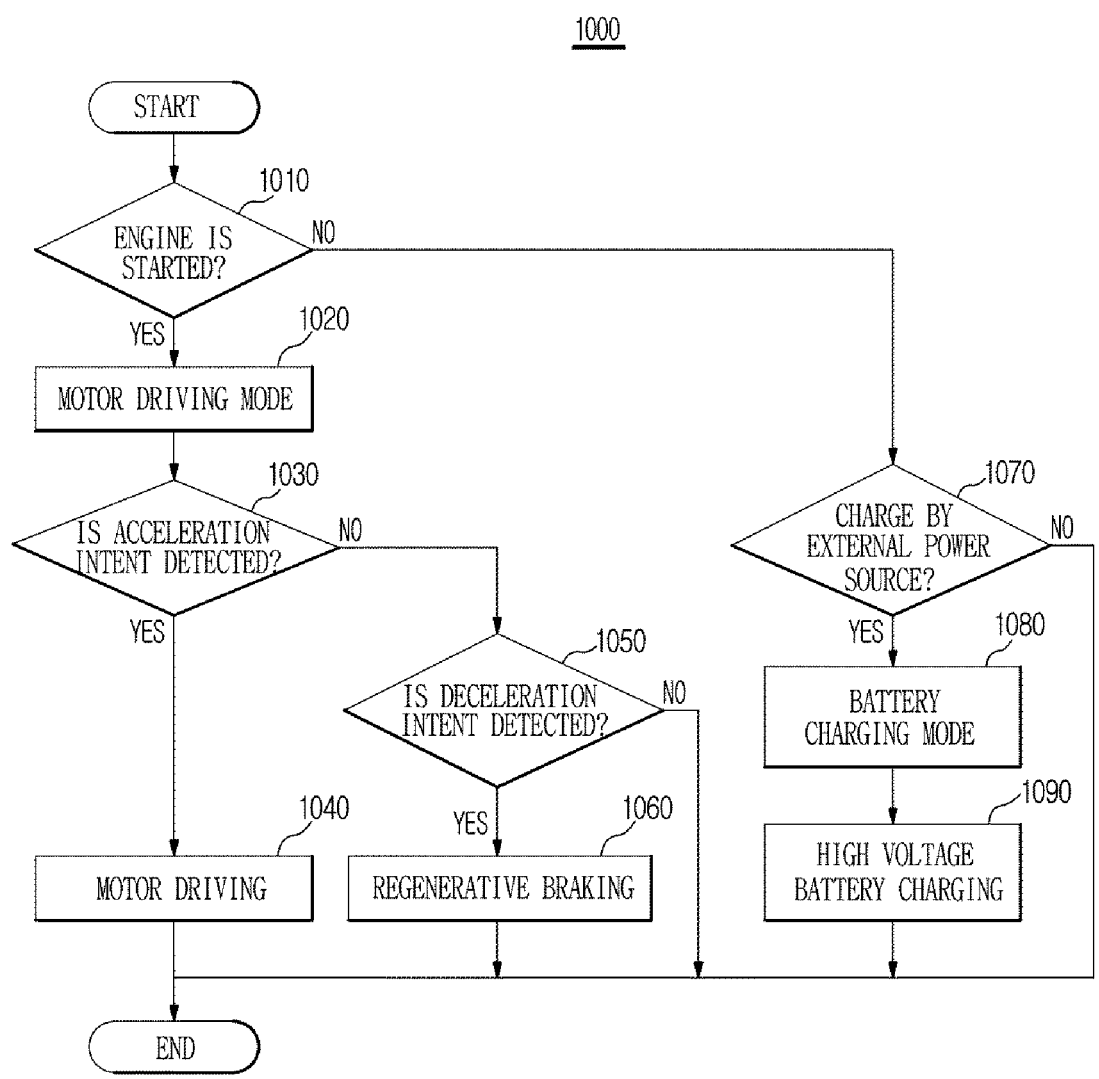
FIG. 11 is a view illustrating a driving and charging method of the vehicle according to one exemplary embodiment.

FIG. 11 is a view illustrating a driving and charging method of the vehicle according to one exemplary embodiment. A driving and charging method 1000 of the vehicles 1*a* and 1*b* will be described with reference to FIG. 11. The method to be described herein below may be executed by a controller. The motor driving and battery charging apparatus 100 may be configured to first determine whether the engine of the vehicle is started (1010).

The motor driving and battery charging apparatus 100 may be configured to determine whether the engine of the vehicle is started based on the basis of a controller area network (CAN) message received via a CAN communication network in the vehicle 1*a* or 1*b*. When the engine of the vehicle is started (YES in 1010), the motor driving and battery charging apparatus 100 may be configured to change an operation mode of the vehicle 1*a* or 1*b* to a motor driving mode (1020). In the motor driving mode, the motor driving and battery charging apparatus 100 may be configured to turn the second switch 192 on to drive the motor 140 and turn the first switch 191 and the third switch 193 off. Since the second switch 192 is turned on, the high voltage battery 110 may be directly connected to the HDC 120, and since the first switch 191 is turned off, the motor 140 may be separated from the rectifier circuit 170. In addition, since the third switch 193 is turned off, the HDC 120 may be separated from the three winding transformer 230. Then, the motor driving and battery charging apparatus 100 may be configured to determine a driver's acceleration intent (1030).

Further, the motor driving and battery charging apparatus 100 may be configured to determine the driver's acceleration intent based on a CAN message and the like received via the CAN communication network of the vehicle 1*a* or 1*b*. For example, a driving control system may be configured to detect a position of an accelerator pedal using a position sensor of the accelerator pedal and transfer a message of the driver's acceleration intent via the CAN communication network when the accelerator pedal is engaged. The motor driving and battery charging apparatus 100 may be configured to determine the acceleration intent of the driver based on the message of the driving control system.

When the motor driving and battery charging apparatus 100 determines that the driver intends to accelerate the vehicle 1*a* or 1*b*. (YES in 1030), the motor driving and battery charging apparatus 100 may be configured to operate the motor 140 (1040). In particular, the motor driving and battery charging apparatus 100 may be configured to operate the HDC 120 to increase a voltage of the high voltage battery 110 and output the increased voltage to the DC link capacitor 180, and may be configured to operate the inverter 130 to generate an AC current from the DC voltage of the DC link capacitor 180 and supply the AC current (a driving current) to the motor 140. The motor 140 may be supplied with the driving current from the inverter 130 to rotate the wheels 25 (see FIGS. 1 and 2). When the motor driving and battery charging apparatus 100 determines that the driver does not have an acceleration intent (NO in 1030), the motor driving and battery charging apparatus 100 may be configured to determine a deceleration intent of the driver (1050).

Particularly, the motor driving and battery charging apparatus 100 may be configured to determine the deceleration intent of the driver based on a CAN message and the like received via the CAN communication network of the vehicle 1*a* or 1*b*. For example, a brake control system may be configured to detect a position of a brake pedal using a position sensor of the brake pedal and transfer a message of the deceleration intent via the CAN communication network when the brake pedal is engaged. The motor driving and battery charging apparatus 100 may then be configured to determine the deceleration intent based on the message of the brake control system.

When the motor driving and battery charging apparatus 100 determines that the driver intends to decelerate the vehicle 1a or 1b (YES in 1050), the motor driving and battery charging apparatus 100 may be configured to perform regenerative braking (1060). The motor driving and battery charging apparatus 100 may be configured to operate the inverter 130 to rectify a regenerative current of the motor 140 and output the rectified current to the DC link capacitor 180, and may be configured to operate the HDC 120 to increase a voltage of the DC link capacitor 180 and output the increased voltage to the high voltage battery 110. The high voltage battery 110 may be charged with the regenerative current generated by the motor 140. When the motor driving and battery charging apparatus 100 determines that the driver does not have a deceleration intent (NO in 1050), the motor driving and battery charging apparatus 100 may end the operation. In addition, when the engine of the vehicle is not started (NO in 1010), the motor driving and battery charging apparatus 100 may be configured to determine whether the vehicle 1a or 1b should be charged by the external power source ES (1070).

While the vehicle 1a or 1b is parked, the motor driving and battery charging apparatus 100 may be configured to detect whether a plug of the external power source ES is inserted into a charging terminal for charging the high voltage battery 110 and determine whether the vehicle 1a or 1b is being charged by the external power source ES based on a detection result. For example, when the plug of the external power source ES is inserted into the charging terminal of the vehicle 1a or 1b, the motor driving and battery charging apparatus 100 may be configured to determine that the vehicle 1a or 1b is being charged by the external power source ES. When the motor driving and battery charging apparatus 100 determines that the vehicle 1a or 1b is being charged by the external power source ES (YES in 1070), the motor driving and battery charging apparatus 100 may be configured to change an operation mode of the vehicle 1a or 1b to a battery charging mode (1080).

In the battery charging mode, the motor driving and battery charging apparatus 100 may be configured to turn the second switch 192 off and turn the first switch 191 and the third switch 193 on to charge the high voltage battery 110. Since the first switch 191 is turned on, the rectifier circuit 170 may be connected to the neutral point N of the motor 140. Since the second switch 192 is turned off, the high voltage battery 110 may be separated from the HDC 120, and since the third switch 193 is turned on, the HDC 120 may be connected to the three winding transformer 230. As a result, the high voltage battery 110 may be connected to the HDC 120 through the full bridge circuit 210 and the three winding transformer 230.

Further, the motor driving and battery charging apparatus 100 may be configured to charge the high voltage battery 110 (1090). The motor driving and battery charging apparatus 100 may be configured to operate the motor 140 and the inverter 130 to decrease reactive power and increase a power factor. While the high voltage battery 110 is charged, the upper driving switches 131 to 136 of the inverter 130 may be turned off and the motor 140 and the inverter 130 may form a power factor corrector. The lower driving switches 131 to 136 of the inverter 130 may be repeatedly turned on and off, and a current having a phase identical to that of an AC voltage of the external power source ES may be output to the DC link capacitor 180 due to the repeated turning on and off of the lower driving switches 131 to 136. The DC link capacitor 180 may be charged with the output current of the motor 140 and the inverter 130.

In addition, the motor driving and battery charging apparatus 100 may be configured to operate the HDC 120, the three winding transformer 230, and the full bridge circuit 210 to transfer electric energy of the DC link capacitor 180 to the high voltage battery 110. While the high voltage battery 110 is charged, the low DC-DC switches 211 to 214 of the full bridge circuit 210 may be turned off, and the HDC 120, the three winding transformer 230, and the full bridge circuit 210 may form an isolated DC-DC converter. The high DC-DC switches 121 and 122 of the HDC 120 may be repeatedly turned on and off in an alternating pattern, and an AC current may be generated from a DC voltage of the DC link capacitor 180 due to the turning of and off of the high DC-DC switches 121 and 122.

The AC current may be transferred to the full bridge circuit 210 due to a mutual inductance between the third coil 233 and the first coil 231 of the three winding transformer 230. The full bridge circuit 210 may be configured to rectify the AC current, and output the rectified current to the high voltage battery 110. As described above, electric power of the external power source ES may be supplied to the high voltage battery 110 through the motor 140, the inverter 130, the DC link capacitor 180, the HDC 120, the three winding transformer 230, and the full bridge circuit 210, and thus the high voltage battery 110 may be charged. When the motor driving and battery charging apparatus 100 determines that the vehicle 1a or 1b does not need to be charged by the external power source ES (NO in 1070), the motor driving and battery charging apparatus 100 may end the operation.

As is apparent from the above description, a motor driving and battery charging apparatus and a vehicle that do not use an additional charging apparatus for charging a vehicle battery from an external AC power source are provided. A motor driving and battery charging apparatus and a vehicle which are capable of charging a vehicle battery from an external AC power source using a driving motor and an inverter are provided. A motor driving and battery charging apparatus and a vehicle which are capable of decreasing a vehicle battery charging time using a driving motor and an inverter are provided.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments may thus be implemented through computer readable code/instructions in/on a medium, e.g., a non-transitory computer readable medium, to control at least one processing element to implement any above described exemplary embodiment. The medium can correspond to any medium/media permitting the storing and/or transmission of the computer readable code.

While exemplary embodiments have been described with respect to a limited number of embodiments, those skilled in the art, having the benefit of this disclosure, will appreciate that other embodiments may be devised which do not depart from the scope as disclosed herein. Accordingly, the scope should be limited only by the attached claims.

What is claimed is:

1. A motor driving and battery charging apparatus, comprising:
    a motor including a plurality of coils;
    a rectifier circuit connected to the plurality of coils;
    a high voltage battery;
    an inverter configured to generate a driving current from an output voltage of the high voltage battery and supply the driving current to the motor, while the motor operates,
    wherein while the high voltage battery is charged:
        the rectifier circuit is configured to rectify an alternating current (AC) of an external power source;
        the motor and the inverter are configured to compensate for a power factor of the current rectified by the rectifier circuit; and
        the high voltage battery is charged with an output current of the motor and the inverter;
    a high direct current (DC) convertor (HDC) configured to increase the output voltage of the high voltage battery while the motor operates;
    a DC link capacitor configured to apply the voltage increased by the HDC to the inverter;
    a low voltage battery;
    a low DC-DC convertor (LDC) configured to reduce the output voltage of the high voltage battery and apply the reduced voltage to the low voltage battery;
    a three winding transformer having a first coil and a third coil; and
    a full bridge circuit configured to generate an AC current from the output voltage of the high voltage battery and output the AC current to the first coil,
    wherein the third coil is connected to the HDC,
    wherein while the high voltage battery is charged, the DC link capacitor is charged with the output current of the motor and the inverter;
    wherein while the high voltage battery is charged, the HDC is configured to generate an AC current from an output voltage of the DC link capacitor and output the AC current to the third coil; and
    wherein while the high voltage battery is charged, the full bridge circuit is configured to rectify an AC current output from the first coil and output the rectified current to the high voltage battery.

2. The apparatus of claim 1, further comprising:
    a first switch disposed between the rectifier circuit and the plurality of coils; and
    a controller configured to turn the first switch off while the motor operates, and turn the first switch on while the high voltage battery is charged.

3. The apparatus of claim 1, wherein the LDC includes:
    a second coil; and
    a low AC-DC rectifier circuit configured to rectify an AC current output from the second coil and output the rectified current to the low voltage battery.

4. The apparatus of claim 1, further comprising:
    a first switch disposed between the rectifier circuit and the plurality of coils;
    a second switch disposed between the high voltage battery and the HDC; and
    a third switch disposed between the third coil and the HDC.

5. The apparatus of claim 4, further comprising a controller configured to operate the first switch, the second switch, and the third switch, wherein:
    while the motor operates, the controller is configured to turn the first switch off, turn the second switch on, and turn the third switch off; and
    while the high voltage battery is charged, the controller is configured to turn the first switch on, turn the second switch off, and turn the third switch on.

6. A motor driving and battery charging apparatus, comprising:
    a rectifier circuit configured to rectify an alternating current (AC) supplied from an external power source;
    a power factor corrector including a plurality of coils disposed in a motor and a plurality of driving switches disposed in an inverter, and configured to compensate for a power factor of the current rectified by the rectifier circuit;
    a high voltage battery charged with a current output from the power factor corrector,
    wherein, while the motor operates, the inverter is configured to generate a driving current from an output voltage of the high voltage battery and supply the driving current to the motor;
    a high direct current (DC) convertor (HDC) configured to increase the output voltage of the high voltage battery while the motor operates;
    a DC link capacitor configured to apply the voltage increased by the HDC to the inverter;
    a low voltage battery;
    a low DC-DC convertor (LDC) configured to reduce the output voltage of the high voltage battery and apply the reduced voltage to the low voltage battery;
    a three winding transformer having a first coil and a third coil; and
    a full bridge circuit configured to generate an AC current from the output voltage of the high voltage battery and output the AC current to the first coil,
    wherein the third coil is connected to the HDC,
    wherein while the high voltage battery is charged, the DC link capacitor is charged with the output current of the motor and the inverter;
    wherein the high voltage battery is charged, the DC is configured to generate an AC current from an output voltage of the DC link capacitor and output the AC current to the third coil; and
    wherein while the high voltage battery is charged, the full bridge circuit is configured to rectify an AC current output from the first coil and output the rectified current to the high voltage battery.

7. The apparatus of claim 6, further comprising:
a first switch disposed between the rectifier circuit and the plurality of coils; and
a controller configured to turn the first switch off while the motor operates, and turn the first switch on while the high voltage battery is charged.

8. The apparatus of claim 6, further comprising:
a direct current (DC) link capacitor charged with the current output from the power factor corrector; and
an isolated DC-DC converter configured to change an output voltage of the DC link capacitor and output the changed output voltage to the high voltage battery.

9. The apparatus of claim 8, wherein the isolated DC-DC converter includes:
a three winding transformer having a first coil and a second coil;
a primary transformer circuit configured to generate an AC current from the output voltage of the DC link capacitor and output the AC current to the first coil; and
a secondary circuit configured to rectify the AC current output from the second coil and output the rectified current to the high voltage battery.

10. The apparatus of claim 9, wherein:
while the motor operates, the primary transformer circuit is connected to the high voltage battery and is configured to increase the output voltage of the high voltage battery; and
while the motor operates, the DC link capacitor is configured to apply the voltage increased by the primary transformer circuit to the inverter.

11. The apparatus of claim 9, further comprising:
a first switch disposed between the rectifier circuit and the plurality of coils;
a second switch disposed between the high voltage battery and the HDC; and
a third switch disposed between the third coil and the HDC.

12. The apparatus of claim 11, further comprising a controller configured to operate the first switch, the second switch, and the third switch, wherein:
while the high voltage battery is charged, the controller is configured to turn the first switch on, turn the second switch off, and turn the third switch on; and
while the motor operates, the controller is configured to turn the first switch off, turn the second switch on, and turn the third switch off.

13. A vehicle, comprising:
a wheel;
a motor configured to rotate the wheel and including a plurality of coils;
a rectifier circuit configured to rectify an alternating current (AC) supplied from an external power source, and connected to the plurality of coils;
a high voltage battery;
an inverter configured to generate a driving current from an output voltage of the high voltage battery and supply the driving current to the motor while the motor operates,
wherein while the high voltage battery is charged the motor and the inverter are configured to compensate for a power factor of the current rectified by the rectifier circuit and the high voltage battery is charged with an output current of the motor and the inverter;
a high direct current (DC) convertor (HDC) configured to increase the output voltage of the high voltage battery while the motor operates;
a DC link capacitor configured to apply the voltage increased by the HDC to the inverter,
a low voltage battery;
a low DC-DC convertor (LDC) configured to reduce the output voltage of the high voltage battery and apply the reduced voltage to the low voltage battery;
a three winding transformer having a first coil and a third coil; and
a full bridge circuit configured to generate an AC current from the output voltage of the high voltage battery and output the AC current to the first coil,
wherein the third coil is connected to the HDC,
wherein while the high voltage battery is charged, the DC link capacitor is charged with the output current of the motor and the inverter;
wherein the high voltage battery is charged, the HDC is configured to generate an AC current from an output voltage of the DC link capacitor and output the AC current to the third coil; and
wherein while the high voltage battery is charged, the full bridge circuit is configured to rectify an AC current output from the first coil and output the rectified current to the high voltage battery.

14. The vehicle of claim 13, further comprising:
a first switch disposed between the rectifier circuit and the plurality of coils; and
a controller configured to turn the first switch off while the motor operates, and turn the first switch on while the high voltage battery is charged.

15. The vehicle of claim 13, wherein the LDC includes:
a second coil; and
a low AC-DC rectifier circuit configured to rectify an AC current output from the second coil and output the rectified current to the low voltage battery.

16. The vehicle of claim 15, further comprising:
a first switch disposed between the rectifier circuit and the plurality of coils;
a second switch disposed between the high voltage battery and the HDC;
a third switch disposed between the third coil and the HDC; and
a controller configured to operate the first switch, the second switch, and the third switch,
wherein, while the motor operates, the controller is configured to turn the first switch off, turn the second switch on, and turn the third switch off, and
while the high voltage battery is charged, the controller is configured to turn the first switch on, turn the second switch off, and turn the third switch on.

* * * * *